(12) United States Patent
Hong et al.

(10) Patent No.: US 10,159,025 B2
(45) Date of Patent: Dec. 18, 2018

(54) METHOD AND APPARATUS FOR CHANGING CONNECTION STATE OF UE

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/582,906

(22) Filed: May 1, 2017

(65) Prior Publication Data
US 2017/0325282 A1 Nov. 9, 2017

(30) Foreign Application Priority Data

May 3, 2016 (KR) .................. 10-2016-0054930
Apr. 10, 2017 (KR) .................. 10-2017-0045815

(51) Int. Cl.
*H04W 36/04* (2009.01)
*H04W 76/27* (2018.01)
*H04W 68/02* (2009.01)
*H04W 76/32* (2018.01)

(52) U.S. Cl.
CPC .......... *H04W 36/04* (2013.01); *H04W 76/27* (2018.02); *H04W 68/02* (2013.01); *H04W 76/32* (2018.02)

(58) Field of Classification Search
CPC .................. H04W 76/27; H04W 36/0055
See application file for complete search history.

(56) References Cited

U.S. PATENT DOCUMENTS

| 9,661,482 | B2 * | 5/2017 | Takahashi | H04W 52/0216 |
| 2012/0281566 | A1 * | 11/2012 | Pelletier | H04W 76/27 370/252 |
| 2013/0301499 | A1 * | 11/2013 | Jain | H04W 4/90 370/311 |
| 2015/0009816 | A1 * | 1/2015 | Hsu | H04W 28/0221 370/230.1 |
| 2015/0105039 | A1 * | 4/2015 | Takahashi | H04W 52/0216 455/404.1 |
| 2015/0156719 | A1 * | 6/2015 | Quan | H04W 52/0254 370/311 |
| 2015/0173104 | A1 * | 6/2015 | Takahashi | H04W 4/90 370/329 |

(Continued)

*Primary Examiner* — Dung Hong
(74) *Attorney, Agent, or Firm* — IP Legal Services, LLC

(57) ABSTRACT

The present disclosure relates to a control plane signaling method and apparatus for reducing signaling due to a change in a UE's state, and more particularly, to a method for efficiently changing a connection state of a UE in a radio network without mobility of the UE or a change in a state transition of the UE in a core network. The method of changing, by a UE, a connection state includes receiving an RRC (radio resource control) connection release message including instruction information for instructing to change a state to a light connection state from a base station, configuring the connection state of the UE to the light connection state based on the instruction information, and transmitting an RRC connection resumption request message to the base station without an access class barring operation, when a state change to an RRC connection state is triggered.

13 Claims, 6 Drawing Sheets

(56) References Cited

U.S. PATENT DOCUMENTS

| | | | | |
|---|---|---|---|---|
| 2015/0223146 A1* | 8/2015 | Pinheiro | .................. | H04W 4/14 |
| | | | | 370/230 |
| 2017/0223584 A1* | 8/2017 | Deng | .................... | H04W 48/08 |
| 2017/0230898 A1* | 8/2017 | Hapsari | ................. | H04W 48/10 |
| 2017/0251353 A1* | 8/2017 | Pinheiro | ............... | H04W 76/14 |
| 2017/0359706 A1* | 12/2017 | Pinheiro | ................. | H04W 4/14 |
| 2017/0359759 A1* | 12/2017 | Brown | .................. | H04W 48/12 |
| 2018/0007597 A1* | 1/2018 | Futaki | .................... | H04W 4/70 |
| 2018/0007720 A1* | 1/2018 | Shu | ........................ | H04W 48/00 |
| 2018/0054778 A1* | 2/2018 | Guo | ...................... | H04W 76/10 |

* cited by examiner

FIG.4

RRCConnectionRelease message information element

```
RRCConnectionRelease-v14xy-IE5 ::=    SEQUENCE {
    rrc-LightConnectionIndication-r14 ENUMERATED {true}
    RAN-PagingConfig-r14 ::= SEQUENCE {
        ran-PagingCycle-r14 ENUMERATED { }
        ran-PagingAreaInfo-r14    RAN-PagingAreaInfo-r14
    ran-pagingAreaCellList-r14    SEQUENCE (SIZE (1..maxRanPagingCells-r14)) OF CellIdentity
    min120, min360, min720, infinity}        OPTIONAL, -- Need OP
}
```

METHOD AND APPARATUS FOR CHANGING CONNECTION STATE OF UE

CROSS REFERENCE TO RELATED APPLICATION

This application claims priority from Korean Patent Application Nos. 10-2016-0054930 & 10-2017-0045815, filed on May 3, 2016 & Apr. 10, 2017, which are hereby incorporated by reference for all purposes as if fully set forth herein.

BACKGROUND OF THE INVENTION

1. Field of the Invention

The present disclosure relates to a control plane signaling method and apparatus for reducing signaling due to a change in a user equipment (UE)'s state, and more particularly, to a method for efficiently changing a connection state of a UE in a radio network without mobility of the UE or a change in a state transition of the UE in a core network.

2. Description of the Prior Art

With the development of communication systems, a wide variety of wireless Ues have been introduced to consumers such as businesses and individuals. In mobile communication systems such as LTE (Long Term Evolution), LTE-Advanced, etc., of the current 3GPP-series, there are demands for the development of a technology capable of transmitting large-capacity data at a high speed as comparable to a wired communication network. A high-speed and large-capacity communication system is capable of transmitting and receiving various data such as video, wireless data, etc., beyond voice-oriented services.

In addition, data transmission/reception through a mobile communication system is rapidly increasing due to an increase in the number of UEs using machine type communication (hereinafter, referred to as "MTC"). Meanwhile, in the case of MTC, it is necessary to periodically transmit and receive a small amount of data, and a low-power and low-cost UE can be used.

Accordingly, there is a demand for a technique for transmitting and receiving data by a plurality of UEs while reducing power consumption.

In the case of a UE that transmits a small amount of data periodically or a periodically, it is necessary to change an RRC (radio resource control) connection state to transmit a small amount of data. However, in changing the RRC connection state by the typical method, a data transmission/reception procedure between a UE and a base station and between a base station and a core network has been complicated.

Such a transmission/reception procedure causes a relatively significantly high data load compared to a small amount of data that the UE desires to transmit. That is, there is a problem in that an unnecessary data overload occurs in an RRC connection state change procedure for transmitting a small amount of data.

This problem is likely to result in an increase in a data load of the entire communication system along with an increase in the number of UEs which periodically transmit small amounts of data.

Therefore, there is a need for specific research on a method and a procedure for changing a connection state of a UE, which can transmit and receive a small amount of data without seriously increasing the data load of the entire communication system according to a change of a wireless communication environment.

SUMMARY OF THE INVENTION

In this background, an aspect of the present disclosure is to provide a method and apparauts for achieving fast data transmission/reception while reducing a load of the entire communication system by adding a light connection state to an RRC (radio resource control) connection state and an RRC idle state which are connection states of a UE.

Another aspect of the present disclosure is to provide a paging method for whether an operation for congestion control is performed when a UE is shifted from a light connection state to an RRC connection state and for a state transition.

In accordance with an aspect of the present disclosure, there is provided a method in which a UE changes a connection state, including: receiving, from a base station, an RRC (radio resource control) connection release message including instruction information for instructing to change a state to a light connection state; configuring the connection state of the UE to be the light connection state based on the instruction information; and transmitting an RRC connection resumption request message to the base station without an access class barring operation, when a state change to an RRC connection state is triggered.

In accordance with another aspect of the present disclosure, there is provided a method in which a base station changes a connection state of a UE, including: transmitting, to the UE, an RRC connection release message including instruction information for instructing to change a state to a light connection state; changing a connection state with the UE from an RRC connection state to the light connection state; and receiving an RRC connection resumption request message according to triggering of a state change to the RRC connection state of the UE.

In accordance with still another aspect of the present disclosure, there is provided a UE that changes a connection state, including: a reception unit configured to receive, from a base station, an RRC connection release message including instruction information for instructing to change a state to a light connection state; a control unit configured to configure the connection state of the UE to be the light connection state based on the instruction information; and a transmission unit configured to transmit an RRC connection resumption request message to the base station without an access class barring operation, when a state change to an RRC connection state is triggered.

In accordance with yet another aspect of the present disclosure, there is provided a base station that changes a connection state of a UE, including: a transmission unit configured to transmit, to the UE, an RRC connection release message including instruction information for instructing to change a state to a light connection state; a control unit configured to change a connection state with the UE from an RRC connection state to the light connection state; and a reception unit configured to receive an RRC connection resumption request message according to triggering of a state change to the RRC connection state of the UE.

As described above, according to the present disclosure, a reduced signaling procedure for a UE performing frequent connection state changes can be provided, thereby reducing the data load of the entire communication system.

Further, in another aspect, the present disclosure can reduce a data load by quickly changing the connection state of the UE and reducing core network signaling.

BRIEF DESCRIPTION OF THE DRAWINGS

The above and other objects, features and advantages of the present disclosure will be more apparent from the following detailed description taken in conjunction with the accompanying drawings, in which:

FIG. 4 is a diagram illustrating configuration information for RAN (radio access network) initiation paging according to an embodiment of the present disclosure.

DETAILED DESCRIPTION OF THE EXEMPLARY EMBODIMENTS

Figure 1:
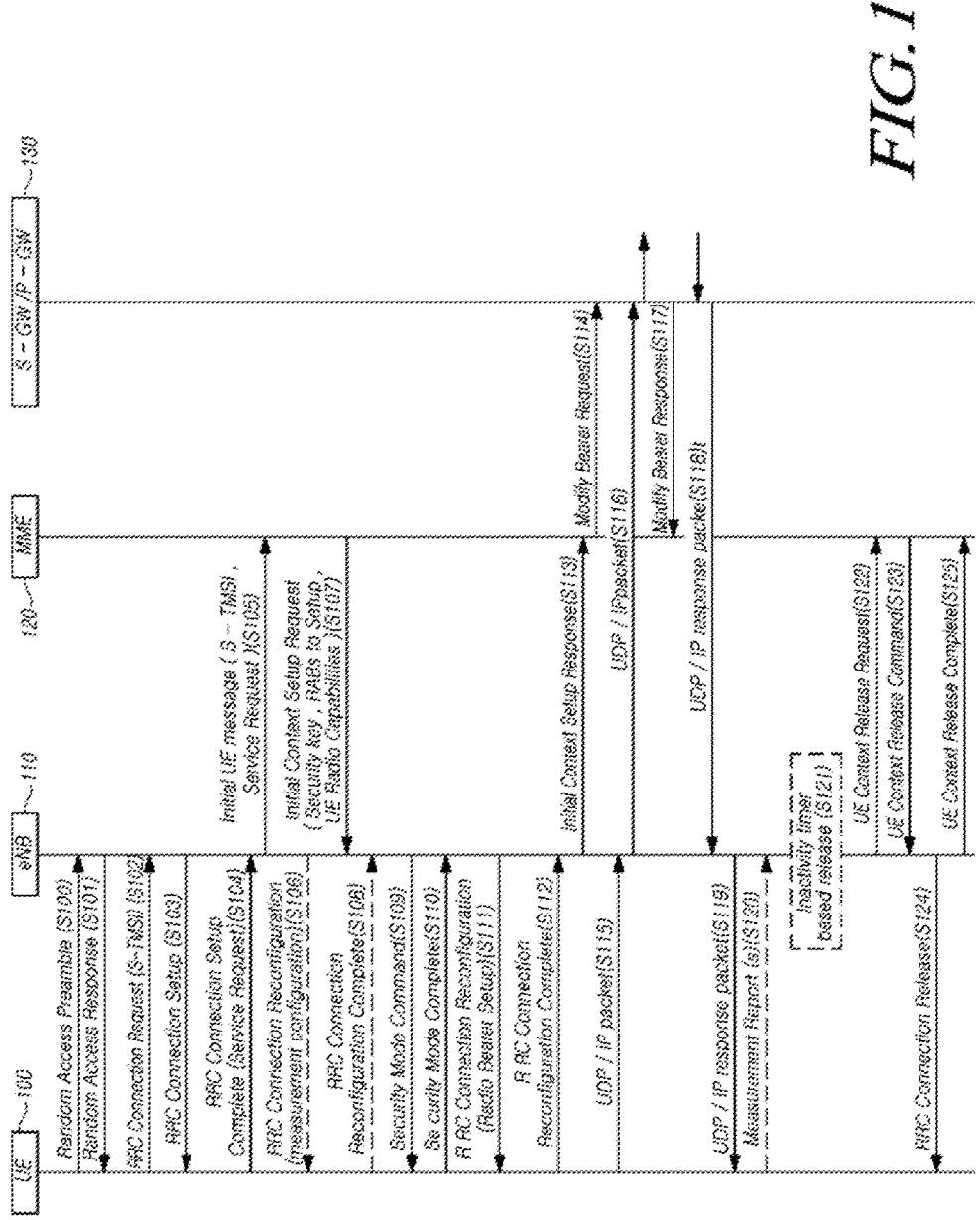
FIG. 1 is a diagram illustrating a specific procedure for changing a connection state of a UE according to the related art.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a MTC terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost(or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost(or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, high speed pacekt access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and the base stataion or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Connection State Transition Procedure of UE

In the typical mobile communication technology, states of a UE and a network are classified into a UE idle state and a connection state. The states of the UE and the network coincide with each other. For example, the state in a radio network (E-UTRAN) and the state in a core network (e.g., an RRC (radio resource control) state and an ECM state) coincide with each other. That is, when being shifted to an RRC idle state, a corresponding UE enters an ECM-idle state, and when being shifted to an RRC connection state, a corresponding UE enters an ECM connection state. In order for a UE in the idle state to transmit data according to a corresponding UE state, a complicated signaling process as shown in FIG. 1 has to be performed. In particular, when the UE transmits a small amount of data, a large overhead occurs.

FIG. 1 is a diagram illustrating a specific procedure for changing a connection state of a UE according to the related art.

Referring to FIG. 1, in operation S100, a UE 100 transmits a random access preamble to a base station 110 so that the UE 100 is shifted from an RRC idle state to an RRC connection state to transmit data. Next, the UE 100 receives a random access response from the base station 110 in operation S101, and the UE 100 requests an RRC connection reset from the base station 110 in operation S102.

The base station 110 sets an RRC connection setup in the UE 100 in operation S103, and the UE 100 reports the completion in operation S104.

When the RRC connection setup in the UE 100 is completed, the base station 110 transmits an initial UE message to an MME 120 to request a service in operation S105. The MME 120 requests an initial context setup from the base station 110 in operation S107. Between operations S105 and S107, the base station 110 may transmit an RRC connection reconfiguration message to the UE 100 to set measurement configuration in operation S106. When the measurement configuration is completed, the UE 100 transmits the RRC connection reconfiguration message to the base station 110 in operation S108.

The base station 110 transmits a security mode command to the UE 100 in operation S109, and the base station 110 receives a response thereto in operation S110.

Next, the base station 110 transmits the RRC connection reconfiguration message for radio bearer setup to the UE 100 in operation S111, and the base stataion 110 receives a response thereto in operation S112. The base station 110 transmits a response to the initial context setup to the MME 120 in operation S113, and the MME 120 transmits a bearer modification request to a gateway 130 in operation S114.

The UE 100 transmits a UDP/IP packet to the base station 110 in operation S115, and the base station 110 transmits a corresponding packet to the gateway 130 in operation S116. The gateway 130 transmits a resposne to the bearer modification request to the MME 120 in operation S117, and the gateway 130 transmits a response to the UDP/IP packet to the base station 110 in operation S118. The base station 110 transmits the corresponding packet to the UE 100 in operation S119.

Through this procedure, the UE 100 transmits a packet to a core network.

Next, in operation S120, the UE 100 transmits a measurement report to the base station 120 according to the measurement configuration periodically or when an event is generated. In operation S121, the base station 120 determines whether the RRC connection state of the UE 100 is released based on the measurement report or a deactivation timer. When the RRC connection state of the UE 100 is determined to be released, the base station 100 requests the MME 120 to release a UE context in operation S122. The MME 120 instructs the base station 110 to release the UE context in operation S123, and thereby the base station 110 instructs the UE 100 to release the RRC connection state in operation S124.

The base station 110 releases the RRC connection state of the UE 100, and then, the base stataion 10 transmits a response to the MME 120 in operation S125.

Through this procedure, the UE in the RRC connection state may be shifted to an RRC idle state.

As described above, in order for a UE to be shifted from the RRC idle state to the RRC connection state or from the RRC connection state to the RRC idle state in the related art, a plurality of signaling procedures are required between the UE and a base station and between the base station and a core network. When a UE periodically transmits a small amount of data in this procedure, an overhead continuously occur. Meanwhile, to reduce the overhead due to the state transition, a UE may be kept in a connection state. However, even when there is no data transmission, it is necessary to periodically measure a network state according to the measurement configuration, and unnecessary power consumption such as reporting a measurement result may be caused. In addition, when the RRC connection state is maintained, a handover signaling overhead due to the movement of the UE increases.

Connection State Transition Procedure for NB-IoT UE

An NB (narrow band)-Internet of Thing (IoT) UE may be operated in a fixed state, and the NB IoT UE may be installed in a specific location or located within a specific range. Due to this characteristic, an NB-IoT UE and a base station support a suspension/resumption procedure. In response to an RRC connection release message, the base station may request the UE to maintain an AS (access sratum) context in an RRC idle state. When the UE is shifted to the RRC idle state (or before the base station transmits the above-described message to the UE) by receiving the RRC connection release message including RRC suspension information, the base station transmits an S1 message requesting the state transition of the corresponding UE to the core network to enter an ECM idle state.

An RRC connection resumption procedure is used for an RRC connection transition in an RRC idle in which information previously stored in a UE and a base station is used to resume an RRC connection. When the UE is shifted to an RRC connection state by initiating the RRC connection resumption procedure (after the base station transmits an RRC connection resumption message to the UE), the base station transmits the S1 message requesting the state transition of the corresponding UE to the core network to enter an ECM connection state.

However, even in this case, the RRC connection state and the ECM connection state are made the same, and thus an unnecessary overhead occurs between the base station and the core network. That is, as described above, in the typical mobile communication technology, there is a signaling overhead problem due to the state transition, and the suspension/resumption procedure for a fixed UE which can reduce the overhead was only applicable to an NB-IoT UE. Accordingly, when the UE moves out of a cell (or a base station) providing the previously stored AS context, a service request procedure initiation had to be performed as shown in FIG. 1 so that the UE transmits uplink data. In addition, since a UE's transition between a suspension state and a resumption state is the same as a UE's transition between an idle state and a connection state, there has been a problem of continuously causing core network signaling (S1 signaling).

In order to solve this problem, there is disclosed a specific procedure for shifting only a radio network connection state without core network signaling.

In the related art, since a radio network connection state transition has occurred based on signaling and user data generated in an upper layer (e.g., non access stratum, IP, GTP, etc.) of an AS (Access Stratum), a UE and a base station require specific operation procedures in order to shift only the radio network connection state without core network signaling.

In addition, when only the radio network connection state is shifted without core network signaling, incoming data for a corresponding UE cannot be received properly. As a method to solve this problem, it is possible to consider a method of self-triggering paging in a radio network, but no concrete method for this has been proposed. In particular, paging according to the prior art is triggered through a core network. Therefore, the method of triggering paging in the radio network may have a problem in that it cannot sufficiently provide a paging function triggered through the core network.

The typical mobile communication technology has a problem of signaling overhead due to state transition. The suspension/resumption procedure capable of reducing the signaling overhead does not reduce core network signaling (S1 signaling). In order to solve this problem, it is possible to consider a method of shifting only the radio network connection state without core network signaling, but there is no concrete method for this. In particular, there was no way to provide access control/congestion control in the RRC connection state. In addition, when only the radio network connection state is shifted without core network signaling, incoming data for a corresponding UE cannot be received properly.

To solve the above-described problems, a specific method of a UE and a base station for performing radio network state transition without core network signaling is proposed in order to reduce the signaling overhead of a core network. In addition, there are provided a specific procedure for enabling a UE to be shifted from an RRC connection state to a light connection state or from the light connection state to the RRC connection state, and a UE access method or a congestion contorl method in a state transition process. In addition, there are provided a specific method and apparatus for providing paging for a UE in a light connection state.

Embodiments described below can be applied to UEs using all mobile communication technologies. For example, the present embodiments can be applied not only to mobile communication UEs to which LTE technology is applied but also to next generation mobile communication (for example, 5G mobile communication) UEs. For convenience of description, a base station may represent an eNode-B of an LTE/E-UTRAN or a base station (a CU (central unit), a DU (distribute unit), or an object implemented by a CU and a DU as one logical object) in a 5G radio network in which a CU and a DU are separated.

Method of Performing Radio Network State Transition without Core Network Signaling In order to reduce signalging due to a UE's state transition, a base station may instruct a UE to perform some or all operations (e.g., one or more operations of cell reselection, paging, radio resource release/suspension, and some radio resource maintenance/standby) being in an RRC idle state so that UE power similar to that in the RRC idle state is consumed, while maintaining a connection (e.g., an S1 connection in LTE or an interface connection between a base station and a core network entity in 5G) between a base station and a core network with respect to the UE.

For convenience of description, in the present specification, a state in which a UE performs some or all operations in the RRC idle state while a control plane or a user plane connection is maintained on a base station and a core network interface is indicated as a light connection state. The light connection state may be referred to by various terms such as a new RRC state, a sub-state of the RRC connection, a UE mobility providing connection state, a radio network paging state, a connection standby state, an RRC idle state for maintaining an S1 connection, an RRC idle state for maintaining a core network connection, an S1 connection standby state, a light connection state, etc., and there is no restriction on the name.

In addition, when a base station instructs a UE in the RRC connection state to be shifted to a light connection state, it may not send a UE context release request message to the core network. That is, signaling is not performed to release a connection on an interface between the core network and the base station. Alternatively, an (S1) connection on the interface between the core network and the base station is maintained. For reference, in the prior art, when releasing the RRC connection state of the UE, the base station sends the UE context release request message to an MME in order to request to release a logical S1 connection associated with the UE.

In this manner, in the present specification, a connection state of a UE is newly defined and described as a light connection state, but as described above, the light connection state merely corresponds to an exemplary name indicating a state in which a UE performs some operations in the RRC idle state while a connection between a base station and a core network with respect to the UE is maintained, and the present disclosure is not limited to the corresponding name.

Hereinafter, a state transition method to a light connection state of a UE and a state transition method from a light connection state to an RRC connection state will be described with reference to the drawing.

Figure 2:
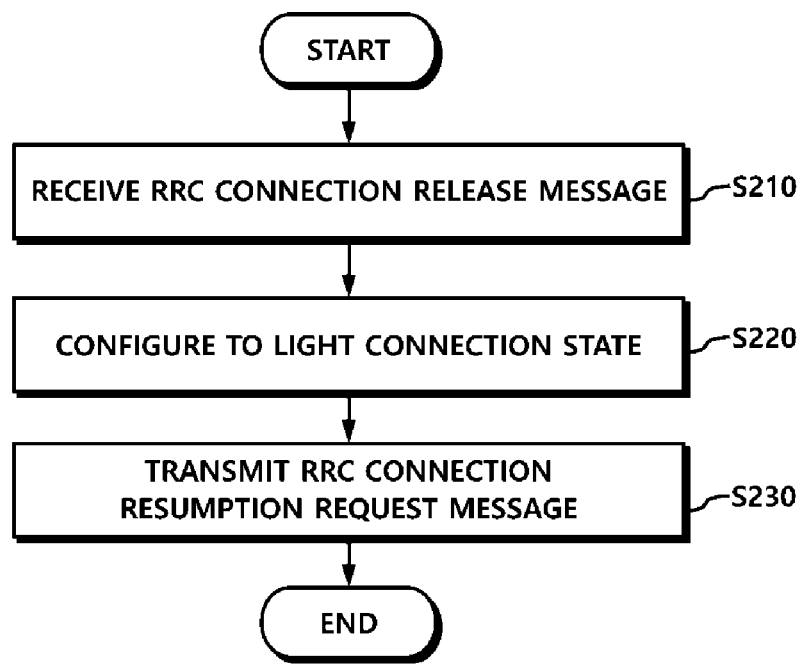
FIG. 2 is a flowchart illustrating operations of a UE according to an embodiment of the present disclosure.

FIG. 2 is a flowchart illustrating operations of a UE according to an embodiment of the present disclosure.

Referring to FIG. 2, in operation S210, a UE receives, from a base station, an RRC connection release message including instruction information for instructing to change a state to a light connection state. The instruction information for instructing to change a connection state of the UE to the light connection state may be transmitted by the base station. The instruction information is described as being included in the RRC connection release message, but may be included in an RRC connection reconfiguration message, as necessary.

When the instruction information is received, the UE has to perform an operation for changing the connection state of the base station to the light connection state.

The RRC connection release message may further include configuration information for RAN (radio access network) initiation paging for a UE in the light connection state. As an example, the configuration information for RAN initiation paging may include at least one of paging cycle information and cell area information for paging update. As another example, the configuration information for RAN initiation paging may include at least one of UE identification information, paging's source cn-domain, UE specific DRX information, and cell area information indicating a light connection. As another example, the RRC connection release message may include at least one of cycle/timer information for triggering an update of the configuration information for RAN initiation paging, the number of cell reselections to trigger update, and cell area information for triggering an update (triggering when it is outside corresponding cell area information).

However, the base station needs to know whether the corresponding UE supports the light connection state. To this end, before operation S210, the UE may trasnmit UE capability information to the base station to indicate whether the UE supports the light connection state.

Meanwhile, in operation S220, the UE configures the connection state of the UE to be the light connection state based on instruction information. For example, when instruction information for instructing to change the state to the light connection state is received from the base station, the UE stops all SRBs and DRBs for the corresponding base station. However, unlike the RRC idle state, the UE may store a UE context. In this case, the base station also stores the UE context for the corresponding UE. Accordingly, the UE in the light connection state is shifted to the RRC connection state, the UE and the base station may reuse the stored UE context to perform fast data transmission/reception. Here, the RAN initiation paging message refers to a paging message triggered in an RAN layer, other than a paging message triggered by an upper layer.

In addition, when the UE in the light connection state moves, it may perform a cell reselection operation instead of a handover. That is, since the RRC connection of the UE is similar to a released state from the base station, the UE may perform a process of reselecting a corresponding cell when the UE moves.

In addition, in operation S230, when the state change to the RRC connection state is triggered, the UE transmits an RRC connection resumption request message to the base station without an access class barring operation. For example, when the transition to the RRC connection state is triggered, the UE in the light connection state may transmit the RRC connection resumption request message to the base station to perform a transition operation from the light connection state to the RRC connection state.

As an example, the state change to the RRC connection state may be triggered by receiving the RAN initiation paging message or detecting pending data. Specifically, when a paging message for the UE in the light connection state is received, the UE may perform the transition operation to the RRC connection state. Alternatively, when detecting pending data to be sent from the UE in the light connection state to the base station, the UE may perform the transition operation to the RRC connection state. Alternatively, when detecdting pending signaling to be sent from the UE in the light connection state to the base station, the UE may perform the transition operation to the RRC connection state.

Meanwhile, the RRC connection resumption request message may include cause information that causes triggering of the state change to the RRC connection state. The cause information that causes the triggering may include information about whether the cause information is due to the above-described paging, the detection of pending data, or the detection of pending signaling.

In addiiton, when the UE in the light connection state changes its connection state to the RRC connection state, the UE may not perform the access class barring operation. For example, when the state transition to the RRC connection state is triggered, the UE may determine whether to perform the access class barring operation based on a current connection state of the UE. As an example, when the UE's connection state at the time when the state change to the RRC connection state is triggered is the RRC idle state, the UE controls the access class barring operation to be performed for the purpose of congestion control. As another example, when the UE's connection state at the time when the state change to the RRC connection state is triggered is the light connection state, the UE controls the RRC connection resumption message to be directly transmitted to the base station without performing the access class barring operation for congestion control. This is because the light connection state is treated as being similar to the RRC connection state, and it is possible to solve a problem caused by a failure of the state transition to the RRC connection state due to not performing the congestion control.

Meanwhile, the UE may perform various operations for access class barring. As examples of the access class barring operation, the UE checks whether system information includes an access barring parameter for the purpose of congestion control, and performs an access barring check when the system information includes the access barring parameter. When the corresponding UE meets an access barring condition based on a result of the access barring check, the UE informs an upper layer of a failure of the RRC connection setup, and then retries the RRC connection setup in the upper layer.

Figure 3:
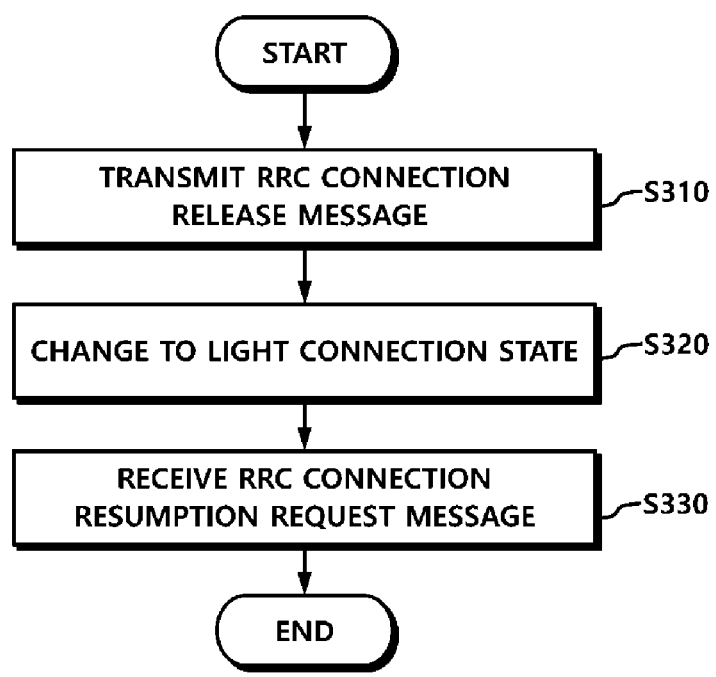
FIG. 3 is a flowchart illustrating operations of a base station according to an embodiment of the present disclosure.

FIG. 3 is a flowchart illustrating operations of a base station according to an embodiment of the present disclosure.

Referring to FIG. 3, in a method of changing a UE's connection state, in operation S310, a base station transmits an RRC connection release message including instruction information for instructing to change a state to a light connection state to a UE. The instruction information is described as being included in the RRC connection release message, but may be included in an RRC connection reconfiguration message, as necessary.

FIG. 4 is a diagram illustrating configuration information for RAN initiation paging according to an embodiment of the present disclosure.

Referring to FIG. 4, the RRC connection release message may further include configuration information for RAN initiation paging for a UE in a light connection state. As an example, the configuration information for RAN initiation paging may include at least one of paging cycle information and cell area information for paging update. As another example, the configuration information for RAN initiation paging may include at least one of UE identification information, paging's source cn-domain, UE specific DRX information, and cell area information indicating a light connection. As another example, the RRC connection release message may include at least one of cycle/timer information for triggering update of the configuration information for RAN initiation paging, the number of cell reselections to trigger update, and cell area information for triggering update (triggering when it is outside corresponding cell area information).

However, a base station needs to know whether the corresponding UE supports the light connection state. To this end, before operation S310, the base station may receive UE capability information from the UE to indicate whether the UE supports the light connection state. As an example, the UE capability information may be transmitted to the base station or a core network through AS capability or NAS (non access stratum) capability. As another example, the UE capability information may be included in UE radio access capability or UE core network capability. The base station may receive the UE capability information through RRC signaling.

Meanwhile, in operation S320, the base station changes a connection state with the UE from an RRC connection state to a light connection state. For example, when the UE is shifted to the light connection state, the base station stops all SRBs and DRBs for the corresponding UE. However, unlike an RRC idle state, the base station may store a UE context of the corresponding UE. Accordingly, when the UE in the light connection state is shifted to the RRC connection state, the UE and the base station may reuse the stored UE context to perform fast data transmission/reception.

Meanwhile, in operation S330, the base station receives an RRC connection resumption request message according to triggering of the state change to the RRC connection state of the UE. For example, when a transition to the RRC connection state for the UE in the light connection state is triggered, the base station may receive the RRC connection resumption request message to perform a transition operation to the RRC connection state of the corresponding UE.

As an example, the state change to the RRC connection state may be triggered by receiving an RAN initiation paging message or detecting pending data. Specifically, when a paging message for the UE in the light connection state is received, the UE may perform the transition operation to the RRC connection state. Alternatively, when detecting pending data to be sent from the UE in the light connection state to the base station, the UE may perform the transition operation to the RRC connection state. Alternatively, when pending signaling to be sent from the UE in the light connection state to the base station is detected, the UE may perform the transition operation to the RRC connection state.

Meanwhile, the RRC connection resumption request message may include cause information that causes triggering of the state change to the RRC connection state. The cause information that causes the triggering may include information about whether the cause information is due to the above-described paging, the detection of pending data, or to the detection of pending signaling.

In addition, as described above, when the UE in the light connection state changes its connection state to the RRC connection state, the UE may not perform an access class barring operation. For example, when triggerring the state transition to the RRC connection state, the UE may determine whether to perform the access class barring operation based on a current connection state of the UE. As an example, when the UE's connection state at the time when the state change to the RRC connection state is triggered is the RRC idle state, the UE controls the access class barring operation to be performed for the purpose of congestion control. As another example, when the UE's connection state at the time when the state change to the RRC connection state is triggered is the light connection state, the UE controls the RRC connection resumption message to be directly transmitted to the base station without performing the access class barring operation for congestion control. This is because the light connection state is treated as being similar to the RRC connection state, and it is possible to solve a problem caused by a failure of the state transition to the RRC connection state due to not performing the congestion control.

Meanwhile, the UE may perform various operations for access class barring. As examples of the access class barring operation, the UE checks whether system information includes an access barring parameter for the purpose of congestion control, and performs an access barring check when the system information includes the access barring parameter. When the corresponding UE meets an access barring condition based on a result of the access barring check, the UE informs an upper layer of a failure of the RRC connection setup, and then retries the RRC connection setup in the upper layer.

As described above, the UE and the base station may perform a UE's state transition operation to the light connection state and a UE's state transition operation from the light connection state to the RRC connection state.

Hereinafter, according to individual examples of each operation, a specific procedure in which a UE performs a state transition to a light connection state and performs a state transition from the light connection state to an RRC connection state will be described in more detail.

Example of Transmitting Whether UE Supports Light Connection

In order to provide a suitable configuration to a UE, a base station has to correctly recognize UE (hereinafter, referred to as a UE or a terminal for convenience of description, but it may refer to a 5G UE as well as an LTE UE) capability. RRC signaling carries AS capabilities and NAS signaling carries NAS capabilities. A core network control plane entity (for example, MME, hereinafter referred to as MME) stores UE capabilities (or UE capability which is composed of UE radio access capability and UE core network capability).

As an example of this, UE core network capability may be indicated by the UE through NAS signaling (attach procedure, etc.). As another example, the UE radio access capability may be transmitted from the UE to the base station using a UE capability transfer procedure and transmitted via an S1 interface. As still another example, the UE radio access capability may be indicated to the MME by the UE through the NAS signaling (attach procedure, etc.), and transmitted to the base station via the S1 interface.

If available, the MME transmits the UE radio access capability to the base station whenever the UE enters the RRC connection state. For example, the MME may transmit UE radio capability to the base station through an S1 initial context setup request message.

The base station may request the UE capability information from the UE, as necessary. For example, after completion of a handover, the base station may acquire the UE capability information from the UE using the UE capability transfer procedure. Then, the base stataion may transmit the acquired UE capability information to the MME.

As an example, information for instructing a UE to support a light connection may be defined in the UE capability information (e.g., UE radio capability information). As another example, the information for instructing a UE to support a light connection may be defined by modifying/extending the UE capability information for NB-IoT suspension/resumption (or AS context caching).

The base station may receive the information for instructing a UE to support a light connection using the above-described methods.

Example of Changing Connection State to Light Connection State

As described above, the base station may determine whether a corresponding UE supports the light connection using the UE capability information. The base station may transmit instruction information for changing a UE's connection state to the light connection state, as necessary.

Hereinafter, an example of transmitting, by a base station, the instruction information and an example of configuring, by a UE, the light connection state will be described separately for each example. The respective examples may be performed individually or in combination.

1) Method of Defining and Indicating New Release Cause in RRC Connection Release Message When recognizing that a UE supports a light connection, a base station may transmit an RRC connection release message indicating a light connection as a release cause to the UE.

The UE that has received the RRC connection release message indicating the light connection as the release cause may perform an operation for the light connection state.

The UE's operation for the light connection state may perform one or more operations of the following operations.
  store UE context
  store identification information of UE in light connection state
  perform some or all operations (e.g., one or more operations of cell reselection, paging, radio resource release/suspension) of UE in RRC idle state, etc.)

1-1) Example of Processing without Instructing Upper Layer to Perform Transition to Light Connection State The UE that has received the RRC connection release message indicating the light connection as the release cause may not instruct an upper layer (NAS and/or user plane radio bearer upper layer) to perform a transition to the light connection state in order to hide a state transition from the upper layer. In this case, the upper layer cannot identify the light conenction state.

As an example, when pending data (for example, MO data) to be sent is generated in the light connection state, the corresponding UE may be regarded as being in the light connection state, so that the UE may transmit the pending data to a PDCP buffer mapped on a corresponding bearer. When a radio resource suspension operation is performed acording to a light connection state transition so that a PDCP entity is suspended, data transmission cannot be performed. Accordingly, when the UE that has received the RRC connection release message indicating the light connection as the release cause does not instruct the upper layer to perform the transition to the light connection state, the PDCP should be kept in the light connection state (or the PDCP should be kept in the same as the connection state). When data is received in a PDCP buffer, the transition to the RRC connection state must be initiated. As an example, when a UE in the light connection state receives a PDCP SDU from the PDCP entity, the UE may request a transition from the light connection state to a connection state from an RRC entity(or RRC layer).

As another example, when pending signaling (for example, MO signaling or NAS signaling) to be sent is generated in the light connection state, a UL information transfer RRC message may be transmitted to the base station by considering that a corresponding UE is in the RRC connection state. Since it can be seen that a UE RRC entity is in the light connection state, when the pending signaling (for example, MO signaling or NAS signaling) to be sent is generated, a transition to the RRC connection state may be initiated.

1-2) Example of Instructing Upper Layer to Perform Transition to Light Connection State and Switching only RRC Connection State The UE that has received the the RRC connection release message indicating the light connection as the release cause may instruct the upper layer to perform a transition to the light connection state. In this case, the upper layer can identify the light conenction state.

As an example, when pending data (for example, MO data) to be sent is generated in the light connection state, the upper layer (for example, NAS) of the UE may not trigger a service request procedure. When the pending data (for example, MO data) to be sent is generated in the light connection state, the upper layer (for example, NAS) of the UE may instruct a lower layer (for example, RRC entity or RRC layer) to perform a transition from the light connection state to the RRC connection state. When a transition instruction from the light connection state to the RRC connection state is received from the upper layer, the RRC entity(or RRC layer) may initiate the transition from the light connection state to the RRC connection state.

As another example, when pending signaling (for example, MO signaling or NAS signaling) to be sent is generated in the light connection state, the upper layer (for example, NAS) of the UE may not trigger a service request procedure. When the pending signaling is generated in the light connection state, the upper layer (for example, NAS) of the UE may instruct the lower layer (for example, RRC) to perform the transition from the light connection state to the RRC connection state. When the transition instruction from the light connection state to the RRC connection state is received from the upper layer, the RRC entity(or RRC layer) may initiate the transition from the light connection state to the RRC connection state. That is, when the transition instruction from the light connection state to the RRC connection state on the RRC is received, the RRC may initiate a transition from the light connection state to a connection state.

When the transition instruction from the light connection state to the connection state is received from the upper layer to initiate the transition to the RRC connection state, the UE does not need to transmit corresponding NAS signaling information (e.g., a transition instruction to the light connection state) to a core network via the base station.

1-3) Example of Instructing Upper Layer to Perform Transition to Light Connection State and Performing Upper Layer Procedure The UE that has received the the RRC connection release message indicating the light connection as the release cause may instruct the upper layer to perform a transition to the light connection state. In this case, the upper layer can identify the light conenction state.

As an example, when pending data (for example, MO data) to be sent is generated in the light connection state, the upper layer (for example, NAS) of the UE may trigger a service request procedure.

As another example, when pending data (for example, MO data) to be sent is generated in the light connection state, the upper layer (for example, NAS) of the UE may trigger an NAS procedure (for example, an attach procedure or a TAU procedure).

As still another example, when pending data (for example, MO data) to be sent is generated in the light connection state, the upper layer (for example, NAS) of the UE may trigger a new NAS procedure for the transition from the light connection state to the RRC connection state.

When the above-described NAS procedure (one of the service request procedure, attach procedure, TAU procedure, and the new NAS procedure) is initiated from the upper layer, it can be recognized that the RRC entity (or RRC layer). of the UE is in the light connection state. Thus the UE may perform the transition from the light connection state to the RRC connection state. As an example, the above-described NAS procedure may be performed between the UE and a core network entity. As another example, the above-described NAS procedure may not be performed between the UE and the core network entity, only the transition to the RRC connection state is performed, and then the RRC entity(or RRC layer) may respond to the NAS. For example, the UE may perform only the transition to the RRC connection state, and does not need to transmit corresponding NAS signaling information (e.g., the transition instruction to the light connection state) to the core network via the base station.

2) Method of Defining and Indicating Information for Indicating Light Connection in RRC Connection Reconfiguration Message When recognizing that a UE supports a light connection, a base station may define information for indicating the light connection in an RRC connection reconfiguration message and indicate the defined information to the UE.

The UE that has received the RRC connection reconfiguration message for indicating the light connection may perform an operation for the light connection state.

The UE's operation for the light connection state may perform one or more operations of the following operations.
  store UE context
  store identification information of UE in light connection state
  perform some or all operations (e.g., one or more operations of cell reselection, paging, radio resource suspension) of UE in RRC idle state.

Meanwhile, the base station may include additional configuration information for instructing additional detailed operations in the light connection state of the UE.

When receiving the RRC connection reconfiguration message indicating the light connection state and suspending radio resources according to instruction information, the UE cannot transmit an RRC connection reconfiguration complete message to the base station. For example, when an SRB for transmitting the RRC message is suspended, RRC signaling cannot be transmitted. Alternatively, when an MAC is reset or when radio configuration information of a corresponding cell is suspended, an RRC connection reconfiguration confirmation message cannot be transmitted to the base station.

2-1) Example of Not Transmitting Reconfiguration Confirmation Message for RRC Connection Reconfiguration Message Indicating Light Connection As an example, the UE that has received the RRC connection reconfiguration message including the information indicating the light connection may not transmit the RRC connection reconfiguration confirmation message to the base station.

2-2) Example of Transmitting Reconfiguration Confirmation Message and Performing Transition to Light Connection when Receiving RRC Connection Reconfiguration Message Indicating Light Connection As an example, the UE that has received the RRC connection reconfiguration message including the information indicating the light connection may first transmit the RRC connection reconfiguration confirmation message to the base station as a response, and then apply the light connection.

2-3) Example of Performing Transition to Light Connection Through New RRC Connection Configuration Message Distinct from RRC Connection Reconfiguration Message As an example, the information indicating the light connection may be received through a downlink RRC message distinct from the RRC connection reconfiguration message. The downlink RRC message may be defined as a message that does not require a success or confirmation message. The UE may receive the downlink message to enter the light connection state.

The UE does not need to transmit a confirmation or failure message for the downlink RRC message to the base station.

2-4) Example of Supporting Some Communication Functions when Receiving RRC Connection Reconfiguration Message Indicating Light Connection to Apply Corresponding Operation As an example, when the UE that has received the RRC connection reconfiguration message including the information indicating that the light connection is shifted to the light connection state, a function (e.g., maintain L2 entity and MAC) for performing an operation for indicating the RRC connection reconfiguration confirmation message to the base station may be maintained for a predetermined time or until a predetermined criterion is satisfied.

2-5) Example of Switching to the Light Connection when Receiving RRC Connection Reconfiguration Message Indicating Light Connection to Apply Corresponding Operation or when Corresponding Timer Expires As an example, the UE that has received the RRC connection reconfiguration message including the information indicating the light connection may operate a timer for performing the transition to the light connection. When receiving the RRC connection reconfiguration message including the information indicating the light connection, the UE initiates the corresponding timer. When the timer expires, the UE is shifted to the light connection state. The UE may transmit the RRC connection reconfiguration confirmation message to the base station until the corresponding timer expires.

As described above, the base station may transmit instruction information through the RRC message, and the UE may configure the light connection based on the instruction information.

UE Identification Information in Light Connection State

Meanwhile, when a UE in a light connection state is not in an RRC connection state, a handover operation is not performed. Therefore, the UE in the light connection state may perform a cell reselection operation according to the movement of the UE.

To this end, even if the UE in the light connection state terminal moves, a corresponding network needs to idenfity the corresponding UE. In addition, when the UE moves, identification information of the base station that configures the corresponding UE to be in the light connection state and/or cell identification information may be required in order to process the UE context for the corresponding UE by inquiring about/fetching/interrogating on the UE context.

In order to effectively perform a state transition for the corresponding UE and data transmission, the following information may be used individually or in combination as identification information of the UE in the light connection state.

1) Store UE Identification Information of Core Network as UE Identification Information The UE identification information of the core network includes a core network entity code and identification information temporarily allocated by the core network entity. Therefore, it is possible to uniquely identify the UE within the core network entity.

2) Store Cell Identification Information and Radio Network Temporary Identification Information as UE Identification Information When a cell within a network is uniquely identified through cell identification information, a UE may be uniquely identified by combining cell identification information and radio network temporary identification information temporarily allocated by a base station accommodating the corresponding cell.

3) Store Base Station Identification Information and Radio Network Temporary Identification Information as UE Identification Information When a base station within a network is uniquely identified through base station identification information, a UE may be uniquely identified by combining the base station identification information and radio network temporary identification information temporarily allocated by the corresponding base station.

4) Store CU Identification Information and Radio Network Temporary Identification Information as UE Identification Information When a CU within a network is uniquely identified through CU identification information, a UE may be uniquely identified by combining the CU identification information and radio network temporary identification information temporarily allocated by the corresponding CU.

UE Paging Example

As described above, a UE may receive the paging message to perform a state transition to the RRC connection state. For example, the state transition to the RRC connection state may be performed on the UE in the light connection state according to a paging procedure. Accordingly, a UE paging method for a UE in the light connection state is proposed.

Cell reselection may be triggered according to the movement of a UE in a light connection state.

When a UE is in the light connection state, a connection (e.g., an S1 connection) between a core network (CN) and a radio network (RAN) is maintained. Therefore, when downlink data arrives, the core network transmits the corresponding data to the base station.

When the UE in the light connection state does not update its location in the base station during the movement of the UE in the light connection state, the base station cannot be aware of where the UE is located in a cell.

When the downlink data arrives at the base station, before transmitting data (user data or signaling data) transferred to a base station (for convenience of description, referred to as anchor base station) that instructs the UE to perform a transition to the light connection state, the anchor base station needs to perform paging on a UE so that the UE is shifted to the RRC connection state. The anchor base station may perform paging by using the following detailed examples individually or in combination 1) Example of Requesting Paging Through Core Network A core network in a light connection state does not know that the UE is in the light connection state, and the core network considers that the UE is in a connection state as an S1 connection is maintained. Therefore, when there is a signaling message to be transmitted to the UE by a core network entity, the core network entity transmits downlink data to the anchor base station.

As an example, when receiving a downlink NAS message (e.g., a downlink NAS transport message) from a control plane core network entity (e.g., MME), the anchor base station may request paging from the MME.

The MME may initiate a paging procedure to perform paging on the UE.

When the UE in the light connection state receives the paging, an RRC connection resumption operation (e.g., transmitting the RRC connection resumption message) may be performed so that the light connection state is shifted to the RRC connection state.

When a base station (hereinafter, referred to as remote base station for convenience of description) that performs the RRC connection resumption operation so that the UE is shifted from the light connection state to the RRC connection state is not the anchor base station, the remote base station may perform a transition to the RRC connection state by receiving the UE context from the anchor base station by inquiring about/fetching/interrogating on the UE context. The remote base station may set a connection with the anchor base station. When the connection between the anchor base station and the remote base station is set, the anchor base station transmits the downlink NAS message to the remote base station. The remote base station transmits the downlink NAS message to the UE.

The remote base station that has performed the RRC conenction resumption operation so that the light connection state is shifted to the RRC connection state by the paging may transmit a confirmation message for paging success to the core network entity.

As another example, when receiving downlink data from a user plane core network entity (e.g., serving GW), the anchor base station may request paging from an MME.

The MME initiates a paging procedure to perform paging on the UE.

When the UE in the light connection state receives the paging, the UE performs an RRC connection resumption operation (e.g., transmitting an RRC connection resumption message) so that the UE is shifted from the light connection state to the RRC connection state.

When the remote base station that has performed the RRC connection resumption operation so that the UE is shifted from the light connection state to the RRC connection state is not the anchor base station, the remote base station may perform a transition to the RRC connection state by receiving the UE context from the anchor base station by inquiring about/fetching/interrogating on the UE context. The remote base station may set a connection with the anchor base station. When the connection between the anchor base station and the remote base station is set, the anchor base station transmits downlink data to the remote base station. The remote base station transmits the downlink data to the UE.

The remote base station that has performed the RRC conenction resumption operation so that the light connection state is shifted to the RRC connection state by the paging may transmit a confirmation message for paging success to the core network entity.

As still another example, the anchor base station may directly perform paging into a corresponding base station cell or a corresponding UE location expected area. When the anchor base station reaches a certain criterion, it can request paging from a core network entity.

The anchor base station may release the stored UE context.

The anchor base station may consider the UE to be in an RRC IDLE state

2) Example of Receiving Information for Paging from Core Network

A core network in a light connection state does not know that the UE is in the light connection state, and the core network considers that the UE is in a connection state as an S1 connection is maintained. Therefore, when there is a signaling message to be transmitted to the UE by a core network entity, the core network entity transmits downlink data to the anchor base station.

As an example, when receiving a downlink NAS message (e.g., a downlink NAS transport message) from a control plane core network entity (e.g., MME), the anchor base station may initiate paging on a cell associated with the anchor base station or a cell capable of initiating paging by the anchor base station.

Since the anchor base station does not receive the paging message from the control plane core network entity, information for paging should be stored so that the anchor base station directly initiates paging on the UE. That is, since paging is initiated in an RAN layer, information for RAN initiation paging should be stored. Hereinafter, the information for RAN initiation paging will be described as information for paging or configuration information for RAN initiation paging.

Hereinafter, various examples in which an anchor base station obtains information for initiating paging will be described.

2-1) Inquiry Method Through Core Network when Anchor Base Station Indicates Light Connection Mode to UE As an example, when an anchor base station transmits information for indicating a light connection state to a UE so that the UE is shifted to the light connection state, the anchor base station may request and receive information for paging from a core network entity. For example, information that the anchor base station receives through the core network entity may include at least one of UE identification information, paging's source cn-domain, UE specific DRX information, and cell area information in which a light connection is indicated/configured.

Hereinafter, the UE specific DRX information indicates DRX information that is signaled to the core network entity (MME) by the UE or DRX information configured in the UE by the core network entity, during a core network procedure (e.g., network registration procedure (attach procedure)). The UE specific DRX information may be modified by the base station. In this case, the base station may inform the MME of the UE specific DRX information. Alternatively, the UE specific DRX information may be modified to be transparent in the MME to be used.

2-2) Inquiry Method Through Core Network Entity when Downlink Data is Received to Core Network Entity in Light Connection State As an example, as to a UE configured in the light connection state, when receiving downlink data (e.g., downlink NAS transport message) from a connection (e.g., a connection between a control plane core network entity and a base station, for example, an S1-C connection) of a corresponding UE, the anchor base station may request and receive information for paging through the control plane core network entity (e.g., MME). For example, the information that the anchor base station requests and receives through the core network entity may include at least one of UE identification information, paging's source cn-domain, UE specific DRX information, and cell area information in which a light connection is indicated/configured.

As another example, as to a UE configured in the light connection state, when receiving downlink data (e.g., user plane data) from a connection (e.g., a connection between a user plane core network entity and a base station, for example, an S1-U connection) of a corresponding UE, the anchor base station may request and receive information for paging through the control plane core network entity (e.g., MME). The information that the anchor base station requests and receives through the core network entity may include at least one of UE identification information, paging's source cn-domain, UE specific DRX information, and cell area information in which a light connection is indicated/configured.

Meanwhile, the base station may buffer the downlink data until receiving the paging information by inquiring about/fetching/interrogating on the paging information. The base station may monitor data reception on an S1-connection associated with the corresponding UE when configuring the light connection state in the UE.

2-3) Method of Receiving Information for Paging when Transmitting Initial Access Context to Base Station with Respect to UE Supporting Light Connection As described above, the base station can be aware of a UE supporting the light connection through UE capability information. The base station may include and transmit information for paging when transmitting corresponding UE context for the UE supporting the light connection to the base station supporting the light connection.

As an example, the control plane core network entity may allow the information for paging to be included in an initial context setup request message, and the control plane core network entity may transmit the initial context setup request message to the base station. The information for paging included in the initial context setup request message may include at least one of UE identification information, paging's source cn-domain, UE specific DRX information, and cell area information in which a light connection is indicated/configured.

3) Example of Updating Paging-related Information and Receiving it from UE to Perform Paging 3-1) Method of Including Confirmation Message for RRC Message Indicating Light Connection As an example, when receiving an RRC message indicating a light connection from a base station, a UE may allow information for paging to be included in a response message and transmit the response message to the base station.

For example, the information for paging may include at least one of UE identification information, paging's source cn-domain, UE specific DRX information, and cell area information in which a light connection is indicated/configured.

3-2) Method of Including Confirmation Message for RRC Message for Transition to Light Connection State As an example, a UE configured in the light connection state may include information for paging and transmit the information for paging to the base station, when requesting RRC connection resumption so that the light connection state is shifted to the RRC connection state. For example, the information for paging may include at least one of UE identification information, paging's source cn-domain, and UE specific DRX information.

As another example, a UE configured in the light connection state may request RRC connection resumption so that the light connection state is shifted to the RRC connection state, and the UE may receive a confirmation or response message for the request. The UE may allow the information for paging to be included in the RRC message for the transition to the light connection state, and the UE may transmit the RRC message to the base station. The information for paging may include at least one of UE identification information, paging's source cn-domain, and UE specific DRX information.

As still another example, a UE configured in the light connection state may request RRC connection resumption so that the light connection state is shifted to the RRC connection state. Next, instruction information for requsting the information for paging may be received at a confirmation/response message for the RRC connection resumption request. In response to this, the UE may allow the information for paging to be included in the RRC message (or RRC message for the transition to the light connection state), and the UE may transmit the RRC message to the base station. The information for paging may include at least one of UE identification information, paging's source cn-domain, UE specific DRX information, and cell area information in which a light connection is indicated/configured.

3-3) Method of Including and Transmitting UE Information when Updating UE Information by Performing Cell Reselection in Light Connection State A UE configured in the light connection state may perform cell reselection according to the movement of the UE.

As an example, when performing cell reselection in the light connection state, the UE may transmit configuration information for RAN initiation paging for the corresponding UE to an anchor base station. The base station may configure information for instructing this operation in the UE. The configuration information for RAN initiation paging may include at least one of UE identification information, paging's source cn-domain, UE specific DRX information, and cell area information in which a light connection is indicated/configured.

As another example, when the UE is shifted to the light connection state, the base station may transmit the configuration information for RAN initiation paging for the corresponding UE in the light connection state to the anchor base station. The configuration information for RAN initiation paging may include at least one of UE identification information, paging's source cn-domain, UE specific DRX information, and cell area information in which a light connection is indicated/configured. The base station may configure additional information for instructing this operation in the UE. As an example, cycle/timer information for triggering update, the number of cell reselections to trigger update, and cell area information for triggering update (triggering when it is outside corresponding cell area information) may be configured in the UE. The UE may transmit the information for paging to the anchor base station when the UE meets trigger conditions.

As above, the examples of the paging method that is one of the trigger conditions in which the UE in the light connection state performs the state transition to the RRC connection state have been described. The UE in the light connection state may perform a transition operation to the RRC connection state when the paging is initiated. In this case, as described above, the UE needs to determine whether to perform an operation for congestion control during the transition operation to the RRC connection state.

Hereinafter, when a UE performs the transition operation to the RRC connection state, detailed examples of performing the operation for congestion control will be separately described.

ACB (Access Class Barring)

Hereinafter, a UE may enter a light connection state by an instruction of a base station. The UE in the light connection state may be located within a cell that indicates the light connection state. Alternatively, the UE may reselect another cell other than the cell that indicates the light connection state according to the movement of the UE. For congestion control for the UE configured in the light connection state, the following methods may be used independently or in combination.

1) Method of Performing RRC Connection Resumption without Applying ACB

The light connection state may be regarded as a sub-state belonging to the RRC connection state, and the ACB may not be applied when the UE is in the light connection state.

As an example, when resuming RRC connection for mobile pending data or mobile pending signaling in the light connection state (e.g., when the light connection state is shifted to the RRC connection state), a UE can resume RRC connection without performing a check (e.g., access barring check) for congestion control.

Specifically, the UE applies a default physical channel configuration. The UE applies a default MAC main configuration. The UE applies a default (e.g., as specified in 3GPP TS 36.331 9.1.1.2) CCCH configuration.

The UE starts a corresponding timer.

The UE starts to transmit an RRC connection resumption message (transition from the light connection state to the RRC connection state).

As another example, when resuming RRC connection for mobile terminated calls in the light connection state (e.g., when the light connection state is shifted to the RRC connection state), a UE may resume the RRC connection without performing a check (e.g, an access barring check) for congestion control (perform a transition from the light connection state to the RRC connection state).

When an RRC connection rejection message is received, the UE may complete the RRC resumption procedure.

Otherwise, the UE may apply a default physical channel configuration. The UE applies a default MAC main configuration. The UE applies a default (e.g., as specified in TS 36.331 9.1.1.2) CCCH configuration. The UE starts a corresponding timer.

The UE starts to transmit an RRC connection resumption message (transition from the light connection state to the RRC connection state).

To this end, the base station may broadcast information for instructing a UE configured in the light conenction state to initiate connection without performing congestion control (e.g., ACB) through system information. Alternatively, the base station may configure information for instructing the UE configured in the light connection state to initiate connection without performing congestion control (e.g., ACB) in the UE through dedicated signaling. Alternatively, a procedure for the transition from the light connection state to the connection state may be predefined so as not to perform congestion control (e.g., ACB) and stored or regulated.

2) Method of Applying ACB, and Waiting for Transmission Permission of Corresponding Cell in AS Layer when Access is Barred A UE in the light connection state may perform cell reselection according to the movement of the UE in the light connection state. When congestion occurs in the reselected cell, information (e.g, ACB information) for congestion control may be broadcasted through system information. When there are a large number of UEs in the light connection state, congestion may be increased by these UEs, so that ACB may be applied even to the UE in the light connection state.

As an example, when resuming RRC connection for mobile pending data in the light connection state (e.g., when performing a transition from the light connection state to the RRC connection state), the UE performs a check (e.g., access barring check) for congestion control.

When a corresponding cell contains access barring information for mobile pending data, access to the corresponding cell is regarded as being barred.

When the access to the cell is barred, the UE may resume RRC connection for the mobile pending data when the mobile pending data is permitted on a current cell or when the UE moves to a cell in which the mobile pending data is permitted.

The UE applies a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection resumption message.

As another example, when pending data (for example, MO data) to be sent is generated in the light connection state, the corresponding UE may be regarded as being in the light connection state, so that the UE may transmit the pending data to a PDCP buffer mapped on a corresponding bearer. In order for an AS layer to wait for transmission permission of the corresponding cell, when the pending data to be sent to the UE in the light connection state is generated, the corresponding data must be buffered in the AS layer. For example, when the pending data to be sent arrives in the light connection state, the UE performs ACB. When access is barred, the UE may buffer the data when the mobile pending data is permitted on a current cell or until the UE moves to a cell in which the mobile pending data is permitted.

As still another example, when resuming RRC connection for mobile pending signaling in the light connection state (e.g., when performing a transition from the light connection state to the RRC connection state), the UE may perform a check (e.g., access barring check) for congestion control.

When a corresponding cell contains access barring information for mobile pending signaling, access to the corresponding cell is regarded as being barred.

When the access to the cell is barred, the UE may resume RRC connection for the mobile pending signaling when the mobile pending signaling is permitted on a current cell or when the UE moves to a cell in which the mobile pending signaling is permitted.

The UE applied a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection resumption message.

Meanwhile, the base station may configure information for instructing the above-described UE's operations in the UE through the RRC message.

3) Method of Applying ACB, Indicating, when Access is Barred, this to Upper Layer, and Waiting for Pending Signaling Permission of Corresponding Cell in Upper Layer A UE in the light connection state may perform cell reselection according to the movement of the UE in the light connection state. When congestion occurs in the reselected cell, information (e.g, ACB information) for congestion control may be broadcasted through system information. When there are a large number of UEs in the light connection state, congestion may be increased by these UEs, so that ACB may be applied even to the UE in the light connection state.

As an example, when resuming RRC connection for mobile pending data in the light connection state (e.g., when performing a transition from the light connection state to the RRC connection state), the UE performs a check (e.g., access barring check) for congestion control.

When a corresponding cell contains access barring information for mobile pending data, access to the corresponding cell is regarded as being barred.

When the access to the cell is barred, the UE may inform the upper layer of a failure of the RRC connection resumption (the transition from the light connection state to the RRC connection state), and inform that access barring is applicable when a corresponding procedure is terminated.

The upper layer may instruct a lower layer to retry or retransmit the RRC connection resumption for the mobile pending data when the mobile pending data is permitted on a current cell or when the UE moves to a cell in which the mobile pending data is permitted.

The UE may resume the RRC connection for the mobile pending data.

The UE applies a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection resumption message. When it is successful, the RRC connection resumption procedure is terminated, and informs the upper layer of this.

As another example, when resuming the RRC connection for mobile pending signaling in the light connection state (e.g., when performing a transition from the light connection state to the RRC connection state), the UE performs a check (e.g., access barring check) for congestion control.

When a corresponding cell contains access barring information for for the mobile pending signaling, access to the corresponding cell is regarded as being barred.

When the access to the cell is barred, the UE informs the upper layer of a failure of the RRC connection resumption and informs that access barring is applicable when the corresponding procedure is terminated.

The upper layer may instruct the lower layer to retry or retransmit the RRC connection resumption for the mobile pending siginaling when the mobile pending signaling is permitted on a current cell or when the UE moves to a cell in which the mobile pending signaling is permitted.

The UE may resume the RRC connection for the mobile pending signaling.

The UE applies a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection resumption message.

4) Method of Applying ACB and Switching to RRC Idle Mode when Access is Barred

A UE in the light connection state may perform cell reselection according to the movement of the UE in the light connection state. When congestion occurs in the reselected cell, information (e.g, ACB information) for congestion control may be broadcasted through system information. When there are a large number of UEs in the light connection state, congestion may be increased by these UEs, so that ACB may be applied even to the UE in the light connection state.

As an example, when resuming RRC connection for mobile pending data in the light connection state (e.g., when performing a transition from the light connection state to the RRC connection state), the UE performs a check (e.g., access barring check) for congestion control.

When a corresponding cell contains access barring information for mobile pending data, access to the corresponding cell is regarded as being barred.

When the access to the cell is barred, the UE may inform the upper layer of a failure of the RRC connection resumption, and inform that access barring is applicable when a corresponding procedure is terminated.

The UE leaves the light connection state. Alternatively, the UE is shifted from the light connection state to the RRC IDLE state. Alternatively, the UE enters the RRC IDLE state.

The upper layer may instruct the lower layer to retry or retransmit the RRC connection resumption for the mobile pending data when the mobile pending data is permitted on a current cell or when the UE moves to a cell in which the mobile pending data is permitted. The upper layer may instruct the lower layer to try, retry, or retransmit a transition from the RRC idle state to the RRC connection state.

The UE may set the RRC connection for the mobile pending data.

The UE applies a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection setup message. When it is successful, the RRC connection setup procedure is terminated, and the UE informs the upper layer of this.

As another example, when resuming the RRC connection for mobile pending signaling in the light connecion state (e.g., when performing a transition from the light connection state to the RRC connection state), the UE performs a check (e.g., access barring check) for congestion control.

When a corresponding cell contains access barring information for for the mobile pending signaling, access to the corresponding cell is regarded as being barred.

When the access to the cell is barred, the UE informs the upper layer of a failure of the RRC connection resumption and informs that access barring is applicable when the corresponding procedure is terminated.

The UE leaves the light connection state. Alternatively, the UE is shifted from the light connection state to the RRC IDLE state. Alternatively, the UE enters the RRC IDLE state.

The upper layer may instruct the lower layer to set the RRC connection for the mobile pending signaling when the mobile pending data is permitted on a current cell or when the UE moves to a cell in which the mobile pending data is permitted. The upper layer may instruct the lower layer to try, retry, or retransmit a transition from the RRC idle state to the RRC connection state.

The UE may set the RRC connection for the mobile pending data.

The UE applies a default physical channel configuration.

The UE applies a default MAC main configuration.

The UE applies a default (e.g., as specified in TS 36.331 9.1.1.2) CCCH configuration.

The UE starts a corresponding timer.

The UE starts to transmit an RRC connection setup message. When it is successful, the RRC connection setup procedure is terminated, and the UE informs the upper layer of this.

As described above, the examples may allow less processing effort for UEs that perform frequent connection setup, and allow larger capacity to be used for network nodes. In addition, power consumption of the UE may be reduced. In addition, congestion control may be effectively performed.

Hereinafter, a UE and a base station capable of performing some or all of the operations of the embodiments described with reference to FIG. 1 to FIG. 4 will be described.

Figure 5:
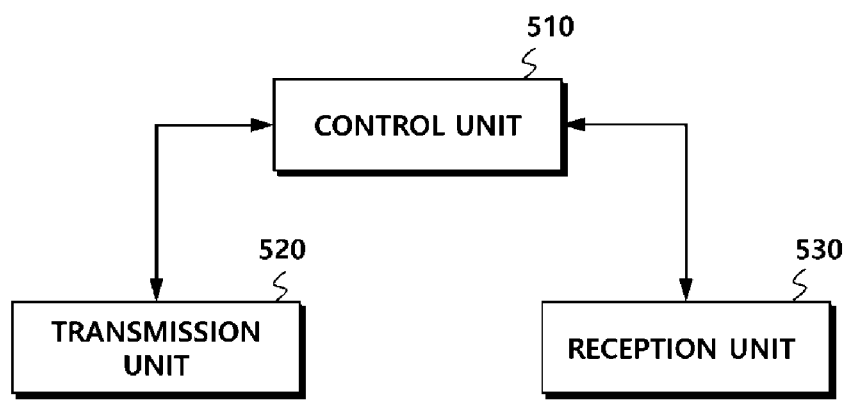
FIG. 5 is a diagram illustrating components of a UE according to an embodiment of the present disclosure.

FIG. 5 is a diagram illustrating components of a UE according to an embodiment of the present disclosure.

Referring to FIG. 5, a UE 500 according to an embodiment of the present disclosure may include a reception unit 530 for receiving an RRC connection release message including instruction information for instructing to change a state to a light connection state from a base station, a control unit 510 for configuring a connection state of the UE to the light connection state based on the instruction information, and a transmission unit 520 for transmitting an RRC connection resumption request message to the base station without an access class barring operation when a state change to an RRC connection state is triggered. The instruction information may be included in an RRC connection reconfiguration message, as necessary.

Meanwhile, the RRC connection release message may further include configuration information for RAN initiation paging for a UE in the light connection state. As an example, the configuration information for RAN initiation paging may include at least one of paging cycle information and cell area information for paging update. As another example, the configuration information for RAN initiation paging may include at least one of UE identification information, paging's source cn-domain, UE specific DRX information, and cell area information indicating a light connection. As still another example, the RRC connection release message may include at least one of cycle/timer information for triggering update of the configuration information for RAN initiation paging, the number of cell reselections to trigger update, and cell area information for triggering update (triggering when it is outside corresponding cell area information).

In addition, the transmission unit 520 may allow information indicating that the UE supports the light connection state to be included in UE capability information and transmit the UE capability information, before receiving the instruction information from the base station or when setting a connection with the base station. Accordingly, the base station may know whether the corresponding UE supports the light connection state, and thus determines whether to transmit the instruction information to the UE.

When the instruction information for instructing the state change to the light connection state is received from the base station, the control unit 510 may stop all SRBs and DRBs for the corresponding base station and store a UE context. In this case, the base station also stores the UE context for the corresponding UE. Accordingly, when the UE in the light connection state is shifted to the RRC connection state, the control unit 510 may reuse the stored UE context to perform fast data transmission/reception. Here, the RAN initiation paging message refers to a paging message triggered in an RAN layer, other than a paging message triggered by an upper layer.

In addition, the control unit 510 may perform a cell reselection operation other than a handover when the UE moves. That is, since the RRC connection of the UE is similar to a released state from the base station, the UE may perform a process of reselecting a corresponding cell when the UE moves.

When the transition to the RRC connection state is triggered, the transmission unit 520 may transmit an RRC connection resumption request message to the base station to perform the transition operation from the light connection state to the RRC connection state. As an example, the state change to the RRC connection state may be triggered by receiving the RAN initiation paging message or detecting pending data. Specifically, when the paging message for the UE in the light connection state is received, the UE may perform a transition operation to the RRC connection state. Alternatively, when pending data to be sent from the UE in the light connection state to the base station is detected, the UE may perform the transition operation to the RRC connection state. Alternatively, when pending signaling to be sent from the UE in the light connection state to the base station is detected, the UE may perform the transition operation to the RRC connection state. The RRC connection resumption request message may include cause information that causes triggering of the state change to the RRC connection state. The cause information that causes the triggering may include information about whether the cause information is due to the above-described paging, the detection of pending data, or the detection of pending signaling.

In addition, the reception unit 530 receives downlink control information, data, and messages from the base station via a corresponding channel. The transmission unit 520 transmits uplink control information, data, and message to the base station via the corresponding channel.

In addition, the control unit 510 controls the overall operation of the UE according to a specific UE operation and congestion control operation processing for performing a radio network state transition without core network signaling required to perform the above-described embodiments.

In addition, when the UE in the light connection state changes the connection state to the RRC connection state, the control unit 510 may not perform an access class barring operation. For example, when the transition to the RRC connection state is triggered, the control unit 510 may determine whether to perform the access class barring operation based on a current connection state of the UE. As an example, when the connection state of the UE at the time when the state change to the RRC connection state is triggered is the RRC idle state, the control unit 510 controls the access class barring operation to be performed for the purpose of congestion control. As another example, when the connection state of the UE at the time when the state change to the RRC connection state is triggered is the light connection state, the control unit 510 controls the RRC connection resumption message to be directly transmitted to the base station without performing the access class barring operation for congestion control.

Meanwhile, the control unit 510 may control various operations to be performed for the access class barring. As examples of the access class barring operation, the UE checks whether system information includes an access barring parameter for the purpose of congestion control, and the UE performs an access barring check when the system information includes the access barring parameter. When the corresponding UE meets an access barring condition based on a result of the access barring check, the UE informs an upper layer of a failure of the RRC connection setup, and then retries the RRC connection setup in the upper layer.

Figure 6:
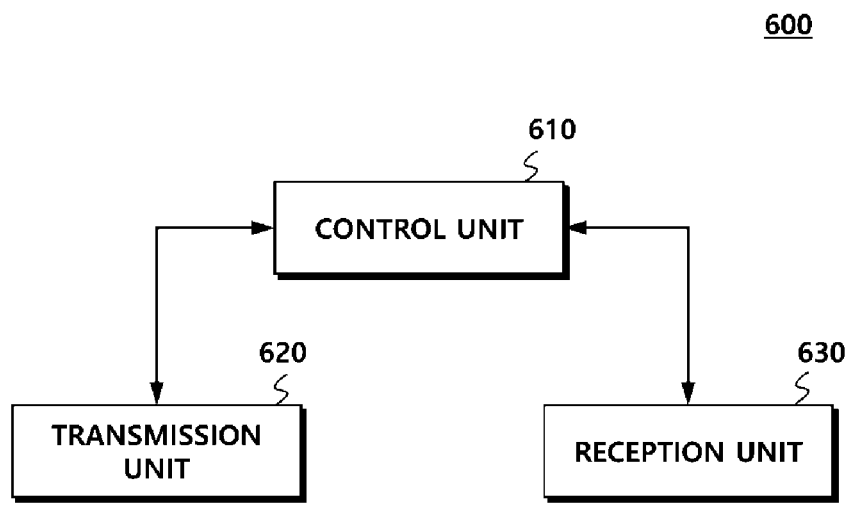
FIG. 6 is a diagram illustrating components of a base station according to an embodiment of the present disclosure.

FIG. 6 is a diagram illustrating components of a base station according to an embodiment of the present disclosure.

Referring to FIG. 6, a base station 600 according to an embodiment of the present disclosure may include a transmission unit 620 for transmitting an RRC connection release message including instruction information for instructing to change a state to a light connection state to a UE, a control unit 610 for changing a connection state with the UE from an RRC connection state to the light connection state, and a reception unit 630 for receiving an RRC connection resumptoin request message according to triggering of a state change to the RRC connection state of the UE.

The RRC connection release message may further include configuration information for RAN initiation paging for the UE in the light connection state. As an example, the configuration information for RAN initiation paging may include at least one of paging cycle information and cell area information for paging update. As another example, the configuration information for RAN initiation paging may include at least one of UE identification information, paging's source cn-domain, UE specific DRX information, and cell area information indicating a light connection. As still another example, the RRC connection release message may include at least one of cycle/timer information for triggering update of the configuration information for RAN initiation paging, the number of cell reselections to trigger update, and cell area information for triggering update (triggering when it is outside corresponding cell area information).

The base station needs to know whether the corresponding UE supports the light connection state. The reception unit 630 may receive UE capability information from the UE, and the control unit 610 may determine whether the UE supports the light connection state. As an example, the UE capability information may be transmitted to the base station or a core network through AS capability or NAS capability. As another example, the UE capability information may be included in UE radio access capability or UE core network capability. The reception unit 630 may receive the UE capability information through RRC signaling.

When the UE is shifted to the light connection state, the control unit 610 stops all SRBs and DRBs for the corresponding UE. However, unlike the RRC idle state, the control unit 610 may store a UE context of the corresponding UE. Accordingly, when the UE in the light connection state is shifted to the RRC connection state, the UE and the base station may reuse the stored UE context to perform fast data transmission/reception.

In addition, when the transition from the light connection state to the RRC connection state is triggered, the control unit 610 may receive an RRC connection resumption request message to perform a transition operation to the RRC connection state of the corresponding UE.

As an example, the state change to the RRC connection state may be triggered by receiving an RAN initiation paging message or detecting pending data. Specifically, when a paging message for the UE in the light connection state is received, the UE may perform the transition operation to the RRC connection state. Alternatively, when pending data to be sent from the UE in the light connection state to the base station is detected, the UE may perform the transition operation to the RRC connection state. Alternatively, when pending signaling to be sent from the UE in the light connection state to the base station is detected, the UE may perform the transition operation to the RRC connection state.

Meanwhile, the RRC connection resumption request message may include cause information that causes triggering of the state change to the RRC connection state. The cause information that causes the triggering may include information about whether the cause information is due to the above-described paging, the detection of pending data, or the detection of pending signaling.

In addition, the control unit 610 controls the overall operation of the base station according to a specific base station operation and UE control operation for performing a radio network state transition without core network signaling required to perform the above-described embodiments.

In addition, the transmission unit 620 and the reception unit 630 are used to transmit and receive signals, messages, and data required to perform the above-described embodiments.

The scope of the present disclosure should be interpreted by the claims attached hereto, and it should be interpreted that all technical spirits within the scope equivalent to the claims pertain to the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method in which a user equipment (UE) changes a connection state, comprising:
receiving, from a base station, an RRC (radio resource control) connection release message including instruction information for instructing to change a state to a light connection state;
configuring the connection state of the UE to be the light connection state based on the instruction information; and
transmitting an RRC connection resumption request message to the base station when a state change to an RRC connection state is triggered, wherein the configuring of the connection state of the UE to the light connection state comprises storing a UE identity which identifies a UE context in the light connection state and the UE context while stopping all SRBs (signaling radio bearers) and DRBs (data radio bearers) of the UE; and wherein a connection state change of the UE to the light connection state is performed without core network signaling, and in the light connection state, a connection state between the base station and a core network for the UE is maintained.

2. The method of claim 1, wherein the state change to the RRC connection state is triggered by at least one of receiving an RAN (radio access network) initiation paging message, detecting pending data, and moving out of a cell area corresponding to configured cell area information for paging update.

3. The method of claim 1, wherein the configuring to the light connection state comprises performing a cell reselection operation when the UE moves.

4. The method of claim 1, wherein the RRC connection release message further includes configuration information for RAN initiation paging for the UE in the light connection state.

5. The method of claim 4, wherein the configuration information for RAN initiation paging includes at least one of paging cycle information and cell area information for paging update.

6. A method of changing, by a base station, a connection state of a user equipment (UE), the method comprising:

transmitting, to the UE, a radio resource control (RRC) connection release message including instruction information for instructing to change a state to a light connection state;

changing a connection state with the UE from an RRC connection state to the light connection state; and receiving an RRC connection resumption request message according to triggering of a state change to the RRC connection state of the UE, wherein the changing of the connection state to the light connection state comprises stopping all SRBs and DRBs with the UE while storing a UE context of the UE; and wherein a connection state change to the light connection state is performed without core network signaling, and in the light connection state, a connection state between the base station and a core network for the UE is maintained.

7. The method of claim 6, wherein the RRC connection release message further includes configuration information for RAN initiation paging for the UE in the light connection state.

8. The method of claim 7, wherein the configuration information for RAN initiation paging includes at least one of paging cycle information and cell area information for paging update.

9. A user equipment (UE) for changing a connection state, the UE comprising:

a reception unit configured to receive, from a base station, a radio resource control (RRC) connection release message including instruction information for instructing to change a state to a light connection state;

a control unit configured to configure the connection state of the UE to be the light connection state based on the instruction information; and a transmission unit configured to transmit an RRC connection resumption request message to the base station when a state change to an RRC connection state is triggered, wherein the control unit configures the connection state of the UE to the light connection state by storing a UE identity which identifies a UE context in the light connection state and the UE context while stopping all SRBs and DRBs of the UE; and wherein a connection state change of the UE to the light connection state is performed without core network signaling, and in the light connection state, a connection state between the base station and a core network for the UE is maintained.

10. The UE of claim 9, wherein the state change to the RRC connection state is triggered by at least one of receiving an RAN initiation paging message, detecting pending data, and moving out of a cell area corresponding to configured cell area information for paging update.

11. The UE of claim 9, wherein the control unit performs a cell reselection operation when the UE moves.

12. The UE of claim 9, wherein the RRC connection release message further includes configuration information for RAN initiation paging for the UE in the light connection state.

13. The UE of claim 12, wherein the configuration information for RAN initiation paging includes at least one of paging cycle information and cell area information for paging update.

* * * * *